(12) United States Patent
Estefen et al.

(10) Patent No.: US 8,099,955 B2
(45) Date of Patent: Jan. 24, 2012

(54) WAVE ENERGY PLANT FOR ELECTRICITY GENERATION

(75) Inventors: Segen Farid Estefen, Rio de Janeiro (BR); Paulo Roberto Da Costa, Rio de Janeiro (BR); Marcelo Martins Pinheiro, Niterói (BR)

(73) Assignee: COPPE/UFRJ—Coordenacao dos Programas de Pos Graduacao de Engenharia da Universidade Federal do Rio de Janeiro, Rio de Janeiro (BR)

( * ) Notice: Subject to any disclaimer, the term of this patent is extended or adjusted under 35 U.S.C. 154(b) by 1027 days.

(21) Appl. No.: 10/587,692

(22) PCT Filed: Jan. 28, 2005

(86) PCT No.: PCT/BR2005/000012
§ 371 (c)(1),
(2), (4) Date: Jul. 27, 2006

(87) PCT Pub. No.: WO2005/072044
PCT Pub. Date: Aug. 11, 2005

(65) Prior Publication Data
US 2008/0231054 A1    Sep. 25, 2008

(30) Foreign Application Priority Data

Jan. 30, 2004   (BR) .................................... 0402375

(51) Int. Cl.
*F03B 17/02* (2006.01)
*F03B 13/18* (2006.01)
*F03B 13/10* (2006.01)
*F04B 17/00* (2006.01)

(52) U.S. Cl. ................ 60/506; 60/495; 60/497; 290/42; 290/53; 417/330

(58) Field of Classification Search ................... 60/495, 60/497, 500, 505, 506; 290/42, 53; 251/122; 417/330–333
See application file for complete search history.

(56) References Cited

U.S. PATENT DOCUMENTS

| | | | | |
|---|---|---|---|---|
| 589,520 A * | 9/1897 | Wright | ............................. | 60/398 |
| 616,467 A * | 12/1898 | Jones | ............................. | 60/398 |
| 616,615 A * | 12/1898 | Hagen | ............................. | 417/332 |
| 1,485,574 A * | 3/1924 | Viora | ............................. | 60/506 |
| 3,521,853 A * | 7/1970 | Pennington et al. | .......... | 251/122 |
| 4,105,368 A * | 8/1978 | Waters | ............................. | 417/53 |
| 4,281,257 A * | 7/1981 | Testa et al. | ...................... | 290/42 |
| 4,792,290 A * | 12/1988 | Berg | ............................. | 417/332 |
| 4,931,662 A * | 6/1990 | Burton | ............................. | 290/42 |
| 5,027,000 A * | 6/1991 | Chino et al. | ...................... | 290/53 |
| 5,291,842 A * | 3/1994 | Sallstrom et al. | ............. | 111/127 |
| 5,397,062 A * | 3/1995 | Krambrock | .................... | 239/590 |
| 5,708,305 A * | 1/1998 | Wolfe | ............................. | 290/53 |
| 5,921,082 A * | 7/1999 | Berling | ............................. | 60/325 |

* cited by examiner

*Primary Examiner* — Thomas Denion
*Assistant Examiner* — Christopher Jetton
(74) *Attorney, Agent, or Firm* — Fildes & Outland, P.C.

(57) ABSTRACT

The invention herein proposed describes a plant operated by the movement of floaters (A) connected to horizontal arms (B). These arms (B) move hydraulic pumps (C), which inject water into the hyperbaric chamber (E). This chamber (E) supplies water through an outflow control valve, to set in motion a conventional turbine (G) that connected to electric generator supplies electricity.

3 Claims, 3 Drawing Sheets

WAVE ENERGY PLANT FOR ELECTRICITY GENERATION

TECHNICAL FIELD

Figure 1:
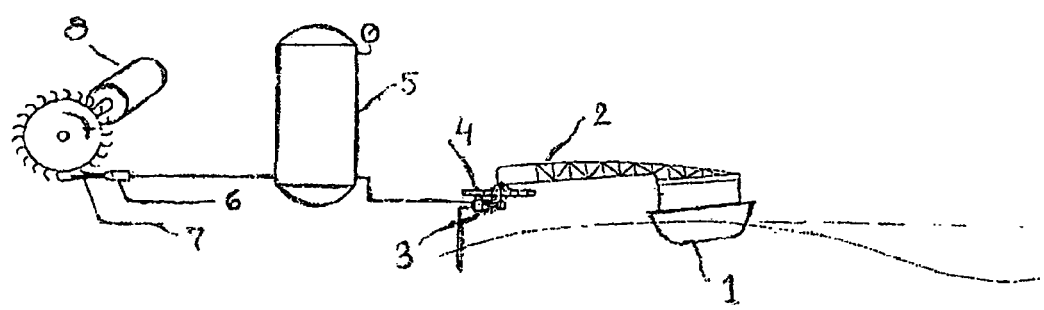

The proposal concept deals with an ocean wave energy plant for electricity generation. It is composed by several components such as floaters, hydraulic pumps, hyperbaric chambers, outflow regulating valve, hydraulic turbine and electric generator.

Previous Technics

In the year of 1799 in France, the wave energy was employed directly to drive pumps, mills and other heavy mechanisms. Since then, experiences with different concepts have been performed worldwide.

Following the oil crisis of the 70's, the scientific research has had a significant increment in extracting increased amounts of electricity from wave energy, particularly in Europe.

Currently the electricity produced through the ocean wave energy is already treated commercially in a few cases. Some examples are: Netherlands with the project AWS (Archimedes Wave Swing) with 2 MW of power, Portugal with the project OWC (Oscillating Water Column) with 400 kW of power and the United Kingdom with the project LIM-PET with 500 kW of power. In Denmark it is in installation tests the project WAVE DRAGON, with power generation up to 4 MW.

The United States, Canada, Australia, Ireland, Norway, New Zealand, Spain, Sweden, Greece, India, China, Korea and Japan are examples of countries that have been working in research and development on ocean wave energy.

The concept of the proposed plant differs from the others considering that it incorporates hyperbaric chambers operating in high pressure up to 2500 psi or 17 MPa (equivalent to 1750 meters of water column). Thus, the plant can operate under pressure up to 17 Mpa.

DETAILED DESCRIPTION OF THE INVENTION

Description of Plant's Equipment and Working Mode

The present invention describes a wave energy plant that operates through the action of the sea waves on floaters, which can be of different sizes and shapes. Rectangular floaters have been used preferentially. Each floater is attached to a mechanical arm articulated at its end point located at the main structure. The arm movements induced by the floater work as an actuator on a horizontal piston pump, sending either pressurized ocean or fresh water to a storage tank (hyperbaric chamber). Inside the chamber there is a certain amount of nitrogen gas so that the chamber works as a hydraulic accumulator. When the pressure within the accumulator reaches the right operational level the pressurized water is ejected to a hydraulic turbine connected to an electric generator to produce electricity.

The amount of water fed into the hyperbaric chamber is set free by an outflow valve controller to move the turbine. This valve operates with pressures up to 2600 psi (17.5 Mpa) and it is able to outflow from 0.05 m³/s to 0.3 m³/s. The turbine shaft rotation is transmitted to an electric generator to convert mechanical energy into electricity. An electronic control system monitors both voltage and frequency of the produced electricity, in order to input electricity properly to the local grid.

The equipments of the plant can be mounted on a fixed platform about five meters above the water sea level, next to the coast line (near shore system). For plants installed on the coast line or on existing piers, onshore system, it is recommended water depths greater than 10% of the wave length to avoid sea bottom effects. The plant can also be installed floating in water depths greater than 35 meters (offshore system).

Process and Operational Parameters

The plant power generation is given by the product of the outflow to move the turbine and the pressure supplied by the hyperbaric chamber during the operation. This pressure in a conventional hydroelectric plant is provided by the outflow from the waterfall height (potential energy). The operational pressure range of the plant is associated with the predominant sea conditions in the installation location, such as average frequency and the significative wave height, according to the table below.

TABLE 1

Relationship between Pressure and Water Column

| Pressure (Psi) | Pressure (MPa) | Water column (m) |
| --- | --- | --- |
| 500 | 3.5 | 350 |
| 1000 | 7.0 | 700 |
| 1500 | 10.5 | 1050 |
| 2000 | 14.0 | 1400 |
| 2500 | 17.5 | 1750 |

The plant can use either the ocean as a water reservoir or operate in closed circuit with stored fresh water; in this case the water is stored in a water tank.

After pumped into the hyperbaric chambers and stored under high pressure, the water jet is released to move the hydraulic turbine. The outflow of the water is controlled by a high pressure valve, especially designed for power control during the variation of the electricity demand, as well as to stop the plant for maintenance or in an emergency situation.

DRAWING'S DESCRIPTION

The wave energy plant in accordance with the present invention as shown in FIG. 1 includes a floater 1, an articulated horizontal arm 2, a hydraulic pump 3, a platform for installation of the equipment 4, a hyperbaric chamber 5, an outflow control valve 6, a hydraulic turbine 7, and an electric generator 8. The plant operates through the action of the sea waves on the floater 1, which may be of different size and shape, but preferably is a rectangular floater. Each floater 1 is attached to a mechanical arm 2 articulated at its end point located at the main structure 4. The arm movements induced by the floater 1 work as an actuator on a horizontal piston pump 3, sending either pressurized ocean water, or fresh water, to a storage tank 5, a so called hyperbaric chamber. Inside the chamber 5 there is a certain amount of nitrogen gas so that the chamber works as a hydraulic accumulator, ejecting pressurized water to a hydraulic turbine when reaching the right operational level.

Figure 2:
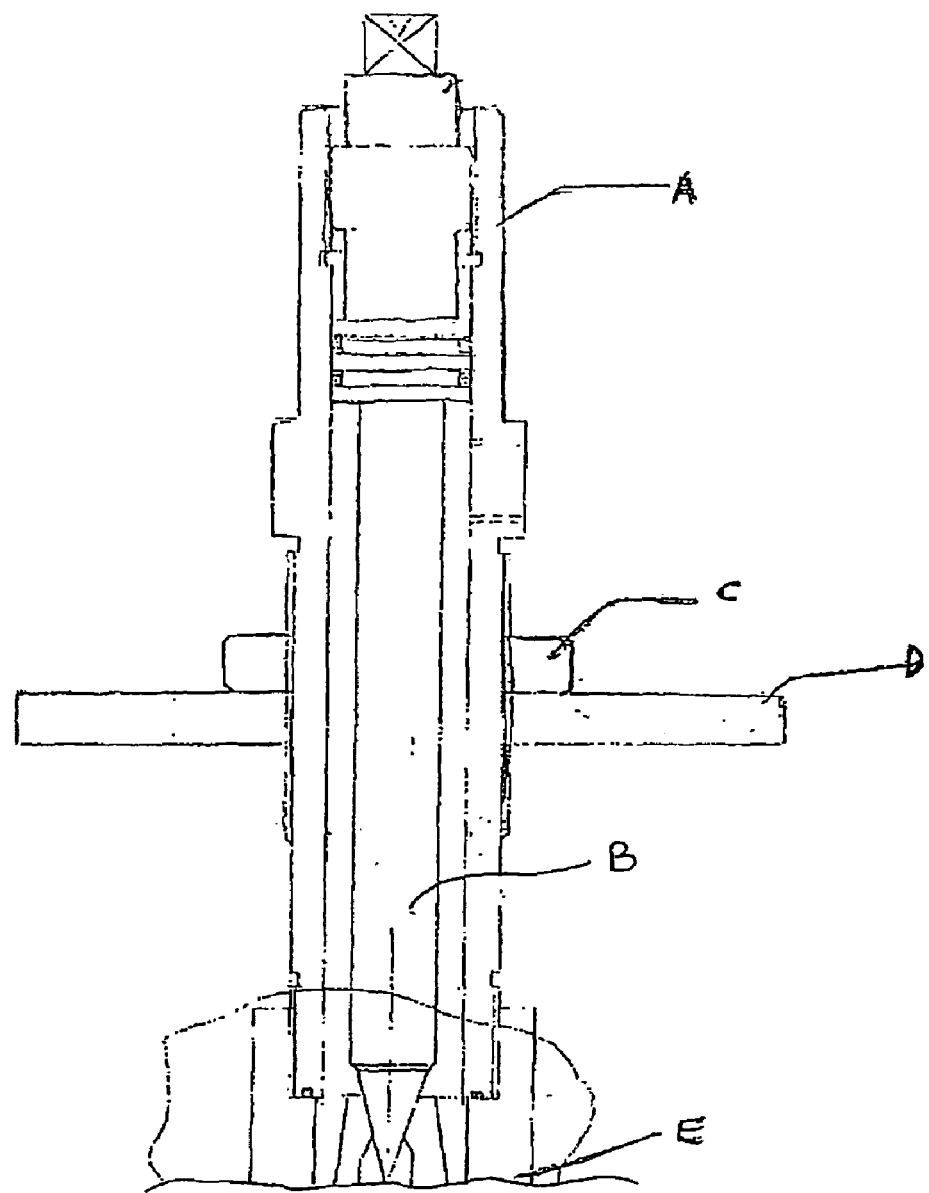
Figure 3:
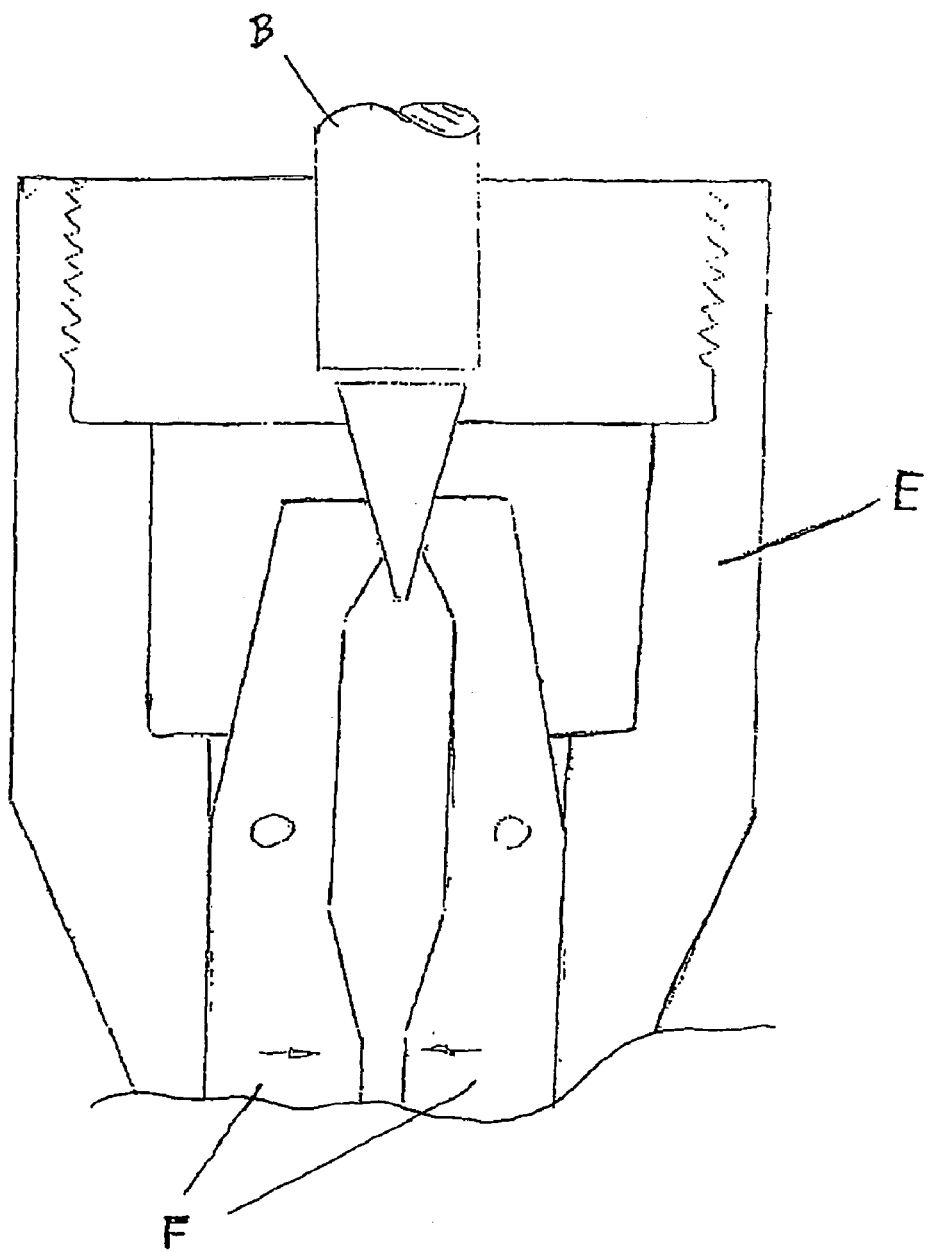

FIGS. 2 and 3 depict the outflow control valve in more detail, including the valve's main body A, the outflow adjustment needle B, the valve adjustment ring C, the main structure of the valve setting D, and the mechanical set for the outflow fine adjustment E. FIG. 3 shows the specific mechanical assembly of the outflow fine adjustment, including the main bod of the adjustment assembly E, the outflow adjustment needle B, and the mobile claws F of the fine adjustment system.

Advantages of the Proposed Wave Energy

Production of clean and renewable energy.

Contribution with additional electricity to the existing grid.

Supply of electricity to islands or other distant places of the coast not reached by the electricity grid system.

Modular and compact installations requiring low outflows and high pressures for operation, which means low expenditure costs.

The increase of power can be obtained by adding modules (floater/arm/pump) to the existing plant.

Clear energy, without environment impacts.

The equipments listed in the present invention do not have to be considered as definitive. Therefore, the number and sort of equipments can suffer variations according to the site characteristics where the plant should be installed.

The invention claimed is:

1. A wave energy plant for electricity generation, said plant comprising:
    a fixed structure;
    a float;
    a generally horizontally disposed mechanical arm having an end connected to said float;
    said mechanical arm having an opposite end articulately connected to said fixed structure;
    a hydraulic pump for pumping water, said hydraulic pump being actuated by said mechanical arm;
    a hyperbaric chamber having an inlet in fluid communication with said hydraulic pump and an outlet, said hyperbaric chamber storing pressurized water delivered by said hydraulic pump;
    an outflow regulating valve connected to said hyperbaric chamber outlet, said outflow regulating valve including a main body, an outflow adjustment needle moveable in said main body, a valve distance adjustment ring disposed around said main body, a valve setting main structure connected to said main body, and a mechanical set for outflow fine adjustment including moveable claws cooperable with said outflow adjustment needle;
    a turbine in fluid communication with said hyperbaric chamber outlet; and
    an electric generator connected to said turbine;
    whereby pressurized water is supplied to said turbine through said hyperbaric chamber outlet to drive said turbine and to generate electricity.

2. The wave energy plant of claim 1, wherein said hyperbaric chamber contains one selected from a group consisting of a mixture including water and nitrogen gas and a mixture including water and air.

3. The wave energy plant of claim 1, wherein said outflow regulating valve outputs water at a high pressure and low flow rate.

* * * * *